Jan. 16, 1940.  W. A. BARY  2,187,143
INSULATOR
Filed Jan. 22, 1938  2 Sheets-Sheet 1

WOLDEMAR A. BARY
INVENTOR

BY John P. Nikanow
ATTORNEY

Jan. 16, 1940.                W. A. BARY                 2,187,143
                                INSULATOR
                           Filed Jan. 22, 1938         2 Sheets-Sheet 2
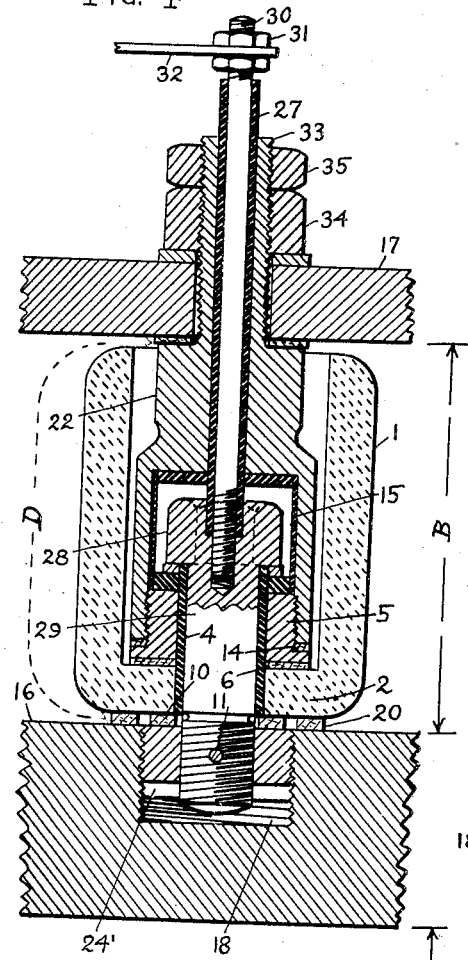
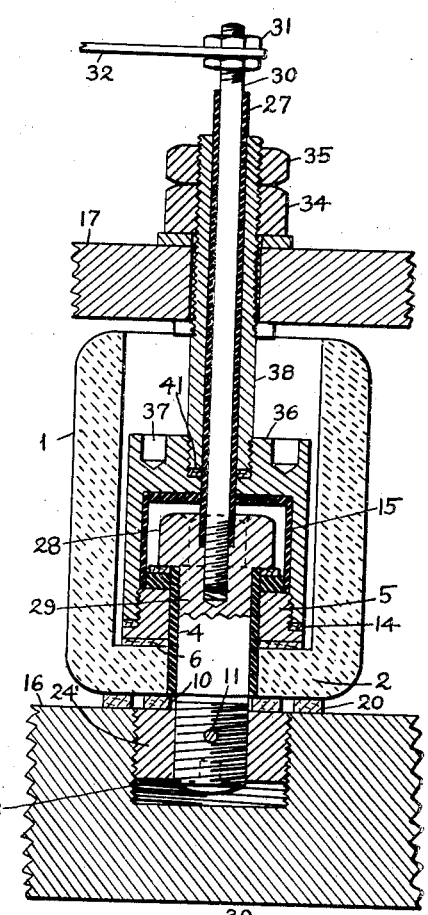
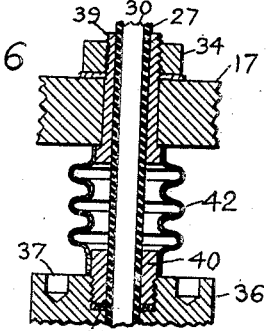
Woldemar A. Bary
INVENTOR
BY John P. Kiromow
ATTORNEY Patented Jan. 16, 1940

2,187,143

UNITED STATES PATENT OFFICE 2,187,143

INSULATOR

Woldemar A. Bary, New York, N. Y.

Application January 22, 1938, Serial No. 186,358

3 Claims. (Cl. 174—31)

My invention relates to insulators and has particular reference to insulators used for supporting anodes in vessels for their electrolytic protection against corrosion, scale, etc.

It is well known that metals, particularly iron, are subject to corrosion in presence of liquids which may act as electrolytes and when other metals are present. Thus water which always contains a more or less appreciable quantity of salts and is therefore conductive, acts as electrolyte in presence of metals, causing their corrosion, electropositive metals being gradually destroyed by such an electrolytic action. The most effective method for preventing corrosion of metal structures in presence of water and similar electrolytic liquids is to impart a negative electric charge to these structures, introducing at the same time positively charged metal objects or anodes in the liquid, insulated from the negative objects. Such a method of electrolytic protection of metals, particularly of iron vessels containing water, was described already in 1869 by Farmer in his United States Patent No. 88,285. A great deal of work has since been done on the electrolytic protection of vessels, including even means for regulating the current supplied to the walls of a vessel so as to overcome natural currents set up by the different metals and/or stray and leakage currents escaping into the electrolyte from other sources. Cumberland, for instance, in his United States Patent No. 1,020,480 of 1912, discloses a method of passing a current through a liquid in a vessel from an internal source and regulating the current so as to overcome the effect of "local currents by galvanic, or voltaic, action between molecules or particles of different metals in a metallic mixture or alloy, or between masses or bodies of different metals conductively connected and also in connection through the electrolyte, and may also be caused by stray currents which reach and tend to escape from a metallic body or structure".

For the effective protection of vessels containing water, such as boilers, condensers, etc., heavy iron blocks or plates are usually employed supported inside of the vessels on suitable insulators and connected with the positive terminal of a dynamo rectifier or battery, the voltage being regulated so as to overcome natural or stray currents and to maintain positive charge on the protecting anodes.

It has been found that under ordinary conditions of conductivity of water and current requirements for preventing corrosion, it is desired to maintain a distance of about 4 inches (from about 3½ to 4½) between the surface of the anode and the cathodic surface of the vessel. Such a distance should be therefore provided between the anode and the wall of a vessel to be protected. In order to fulfill this requirement, the anode supporting insulators must be not more than 4 inches long, so that they can be inserted in the available space, while the path over the insulation must be more than 4 inches in order to prevent current leakage across the insulation. The insulator must be of a relatively small diameter and of such shape as to provide the least obstruction for the protected surface of the walls of the vessel. One of the objects of my invention is therefore to provide an insulator for supporting an anode at a distance of about 4 inches from the wall on which the anode is supported. This is accomplished by providing the insulated support with an outer shell made of a suitable insulating material and extending from the inner side of the wall of a vessel to the inner side of the anode. The shell is made of a relatively small diameter in order to reduce the leakage current over its surface when the latter becomes covered with a film of sediment, and for the same purpose the longitudinal path over the insulator is made larger than the straight distance between the opposed surfaces of the vessel and anode. This is accomplished by providing greater length of path over the insulator than the distance between the anode and the wall of the vessel.

There is a certain danger, however, connected with the use of the inner surface of the anode, this danger arising from the fact that the metal parts of the insulator attached to the anode are attacked by the liquid together with the anode so that the insulating support becomes rapidly damaged or even partly destroyed. For this reason it has even been recommended to insulate the inner side of the anode so as to protect the insulating supports, although such an arrangement renders relatively large portions of the anode inactive. I have found, however, that it is possible to completely seal such insulator parts as are in contact with the anode. For this purpose I provide the outer insulating shell of my insulator with a bottom plate having an aperture for a bolt to which the bottom plate is clamped, the outer clamping nut having threads on the outside for screwing it into the anode plate. By placing elastic sealing washer or gasket between the bottom of the shell around the nut and the anode, the space around the nut is sealed so that the liquid in the vessel cannot reach any metal parts of the insulating support connected to the anode.

In view of the fact that both sides of the anode in my arrangement are active, the anode is made of a relatively thick plate (usually about 2 inches) and the insulator nut is screwed into the anode to the depth corresponding to about one-half of its thickness so that both sides of the anode can be equally used up before it reaches the state when it must be replaced.

Another object of my invention is to provide means to overcome the effect of unequal thermal expansion of insulating material and metal parts of the insulating support on the assembly of the support. For this purpose I provide my insulating shell with a relatively thin bottom wall clamped between metal parts so that the length of unequally expanding parts clamped together is reduced to the minimum thereby rendering the thermal effect negligible without recourse to special compensators. In order to further insure the tight fit of the parts under various conditions, I provide elastic or slightly compressible washers between the clamping parts and the insulated shell.

Another object of my invention is to provide an insulating support which can be fully assembled before placing it in service and in which electropositive parts are entirely sealed from contact with liquids in a protected vessel. For this purpose, the clamping parts holding the insulation shell and having an outer extension for attaching an anode are fully covered with insulating layers inside the shell and encased in a metal shell with a threaded extension for attaching the insulator to the wall of a vessel.

Another object of my invention is to provide an insulating support for the anode with an electric conductor extending through the body of the support from the outside of a vessel to the metal parts in contact with the anode, the conductor being electrically insulated from the grounded parts and fully sealed from the liquid in the vessel.

Another object of my invention is to provide an insulating support with a relatively flexible or yieldable portion extending from the insulator to the wall of a protected vessel and passing therethrough, the flexible portion being also adapted to enclose an electric conductor for the anode.

Another object of my invention is to provide an insulating support for the anode having a longer path for the leakage current across the insulator from its positive to its negative side than the direct distance from the anode to the wall of the vessel at either side of the anode.

Still another object of my invention is to provide an insulating support with an insulator clamped between metal parts so that it is subjected only to compressive stresses with no bending, thereby rendering the structure very strong (porcelain, for instance, will stand over 100,000 lbs. per square inch under compression while the safe limit for bending stress is only 4,000 lbs. per square inch).

My invention is more fully described in the accompanying specification and drawings in which—

Fig. 4 is a sectional elevational view of an insulating support with an electric conductor.

Fig. 5 is a similar view of an insulator with a flexible supporting member.

Fig. 6 is a fractional detail view of a modified construction.

Figure 1:
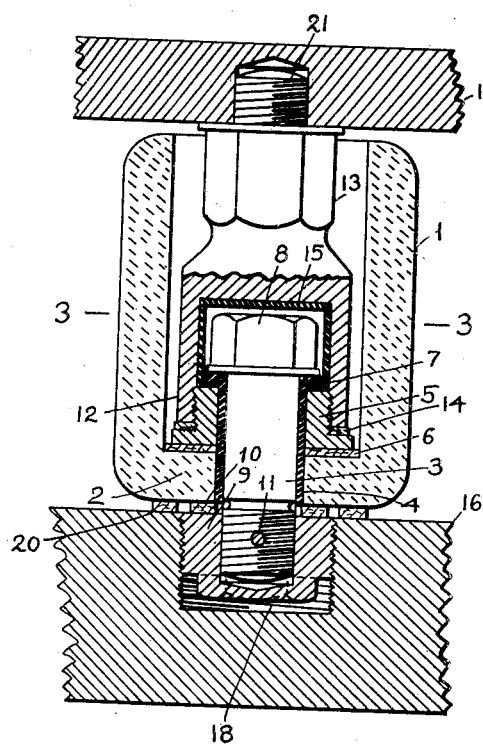
Fig. 1 is a sectional elevational view of my insulating support showing also a part of the wall of a protected vessel and anode.

My insulating support comprises a tubular shell 1 made of a suitable insulating material such as porcelain, glass, molded composition, such as "bakelite" or "isolantite", etc. One end of the shell is closed by a wall 2 preferably of the same thickness as the shell itself so that the shell has the shape of a cup. A bolt 3 passes through a hole in the bottom of the shell with an insulation sleeve 4, collar 5 is placed against the inner side of the bottom portion 2 with an elastic washer 6 preferably made of an impregnated fibrous material, half hard rubber, or a relatively soft metal like lead or copper. An insulation washer 7 is placed between the head 8 of the bolt and the collar 5. The bolt is tightened on the bottom portion 2 by a nut 9 with an elastic washer 10 between the nut and the insulating shell. The nut is held in place by a pin 11. The outer portion of the collar 5 is threaded for a tubular portion 12 of a stud 13 which is tightly screwed on the collar with a water-tight sealing washer 14 between these parts. The tubular portion 12 encloses the head 8 with an insulation lining 15 between the head 8 and the inside of the tubular portion 12.

In the assembled state the insulator can be used for supporting an anode 16 at a distance from a wall 17 of a vessel. For this purpose, the threaded end of the insulator or the nut 9 is screwed tightly into a correspondingly threaded hole 18 in an anode 16 with an elastic water-tight washer 20 between the bottom 2 of the insulation shell and the anode, the inside diameter of the washer being larger than the outside diameter of the nut 9. The hole 18 extends to about half of the thickness of the anode in order to fully utilize the metal of the anode at both sides before it is used up to such an extent that there is danger of water reaching the nut 9. The other end of the insulator, the threaded end 21 of the stud 13, is screwed into a correspondingly threaded hole in a wall 17 of a vessel adapted to contain water or similar liquids, which may be a boiler, condenser, water tank, tank or pan used in chemical industries, etc.

The length of the shell 1 is made such that it extends between the inner surface of the anode 16 and the inner surface of the wall 17 thereby permitting the anode to be placed at the most effective distance from the wall 17 in order to utilize the inner side of the anode.

This distance under ordinary conditions must be about 4 inches or from 3½ to about 4½ inches. The sealing washer 20 fully protects the nut 9 from corrosion. It may be noted that the shell 1 provides a relatively long leakage path for the current so that there will be greater resistance for the flow of current over the surface of the insulator, even if it should become covered with dirt or sediment, than through the liquid between the respective surfaces. The outer portions of the shell are curved inwardly as shown in order to increase the length of the insulating surface between the anode and the wall, so that this surface will remain longer than the distance between the wall and either side of the anode even if the space between the shell and the stud 13 becomes filled with conducting dirt or metal particles.

The outside diameter of the shell is kept relatively small in order to reduce the cross-sectional area of any conducting layer which may be formed on the surface of the shell. The thickness of the bottom part 2 is relatively small so that there is no appreciable effect of the unequal expansion of the part 2 and of the bolt, due to temperature variations, on the tightness of the assembly of the insulator, and very small differences in the thermal expansion or contraction which may take place being taken care of by the elastic or compressible washers 6 and 10. The insulating shell, being clamped between metal parts, is subjected only to compression with no bending stresses so that it can withstand considerable stresses in all directions.

Figure 2:
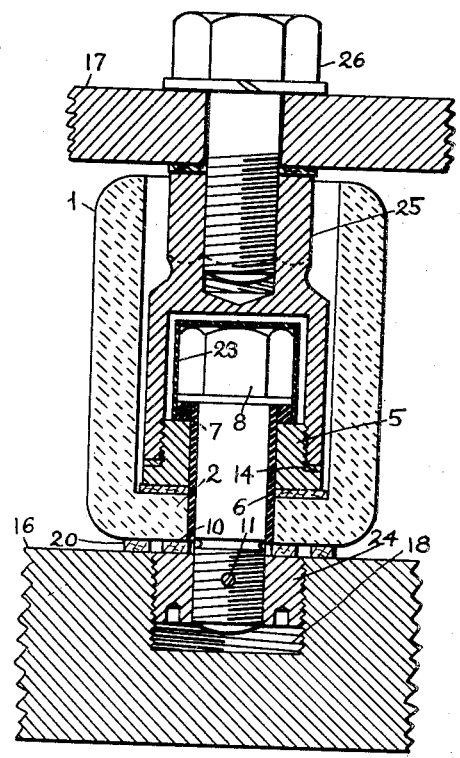
Fig. 2 is a similar view of a modified insulator.
Figure 3:
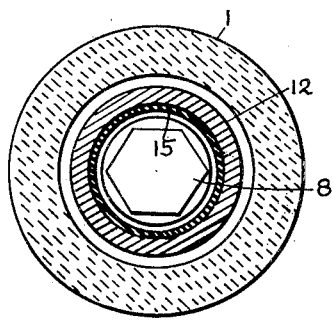
Fig. 3 is a sectional view taken on the line 3—3 of Fig. 1.

It may be noted that the bolt 3 and its head 8 as shown in Fig. 1 are permanently sealed by the socket portion 12 of the stud 13 so that the bolt cannot come in contact with the liquid in the vessel. As a modification, the head 8 of the bolt 3 may be tightly enclosed by an insulation cap 23 in order to exclude air and to avoid condensation of water vapors on the metal when temperature drops below dew point for the air. This arrangement is shown in Fig. 2 which also shows a modified nut 24 and a stud 25 with internal threads for a bolt 26 screwed into the stud from the outside of the vessel.

Under ideal conditions of installation the outer side of the anode is placed at a distance A from the opposite wall of the vessel, this distance A being substantially equal to the distance B between the inner side of the anode and the inner side of the wall of the vessel, as shown in Fig. 4, and the travel from the part 20 to the part 22 or distance D is longer than the distances A or B.

Fig. 4 illustrates an insulator which also serves to conduct electric current to the anode 16. For this purpose, the stud 22 and its extension 33 are bored out inside for the insulation tube 27 extending into a corresponding bore in the head 28 of a bolt 29 with a nut 24', the head being also provided with a tapped hole below the bore for the end of a conducting rod 30 extending through the tube 27 to the outside of the vessel and provided with nuts 31 for clamping a lead 32. The threaded end 33 of the stud is fitted into the wall 17 of the vessel and is clamped in place with nuts 34 and 35.

Another modification is shown in Fig. 5. A socket member 36 enclosing the head 28 of the bolt 29 has holes 37 for a spanner wrench and is tapped for the end of a metal tube 38, made of a relatively soft metal, such as copper, enclosing the insulation tube 27 and passing through the wall 17 of the vessel. The free length of the tube in the insulator is sufficient to allow certain bending or deflection of the insulator as may be caused by the expansion or contraction of the anode when the latter is made in the form of a long piece supported on insulators such as is shown in Fig. 1 with separate insulators for conducting electric current, the latter insulators being preferably of the type shown in Fig. 5.

Fig. 6 illustrates a modification of the device shown in Fig. 5 which is used when it is desired to provide a large degree of flexibility to the insulating support. The socket 36 has a short nipple 40 and a shouldered threaded tube 39 is fitted in the wall 17 being clamped by the nut 34. The nipple 40 and the tube 39 are joined by a flexible tubing 42 with corrugated walls permitting a relatively large degree of flexure for the structure, the rod 30 and insulation 27 being also made sufficiently flexible. Such a large degree of flexibility is required for installations using long anodes subject to considerable variations in length at different temperatures.

I claim as my invention:

1. An insulator for supporting an anode in a vessel, comprising an elongated member adapted to be attached at one end to the wall of the vessel, the other end of the member being in the shape of a socket, a bolt fitted by its head in the socket, an annular plug threaded into the socket around the bolt for retaining the bolt head in the socket, means to insulate the bolt from the elongated member, a cup-shaped insulation member having a central aperture fitting over the bolt, a nut on the bolt clamping the insulation member against the elongated member, means to support the anode on the end of the bolt, and means to seal the space around the bolt between the insulation member and the elongated member, the insulation member extending on the outside of the elongated member to within a short distance from the wall of the vessel and at a distance from the elongated member, the elongated member being thereby exposed to the liquid in the vessel.

2. An insulator for supporting an anode in a vessel, comprising an elongated member adapted to be attached at one end to the wall of the vessel, the other end of the member being in the shape of a socket, a bolt fitted by its head in the socket, an annular plug threaded into the socket around the bolt for retaining the bolt head in the socket, means to insulate the bolt from the elongated member, a cup-shaped insulation member having a central aperture fitting over the bolt, a nut on the bolt clamping the insulation member against the elongated member, means to support the anode on the end of the bolt, means to seal the space around the bolt between the insulation member and the elongated member, the insulation member extending on the outside of the elongated member to within a short distance from the wall of the vessel and at a distance from the elongated member, the elongated member being thereby exposed to the liquid in the vessel, and an insulated conductor extending from the bolt through the socket to the outside of the vessel.

3. An insulator for supporting an anode in a vessel, comprising an elongated member adapted to be attached at one end to the wall of the vessel, the other end of the member being in the shape of a socket, a bolt fitted by its head in the socket, means to retain the bolt head in the socket, means to insulate the bolt from the elongated member, a cup-shaped insulation member having a central aperture fitting over the bolt, a nut on the bolt clamping the insulation member against the elongated member, means to support the anode on the end of the bolt, and means to seal the space around the bolt between the insulation member and the elongated member, the insulation member extending on the outside of the elongated member to within a short distance from the wall of the vessel and at a distance from the elongated member, the elongated member being thereby exposed to the liquid in the vessel.

WOLDEMAR A. BARY.